Dec. 15, 1931.    C. W. BELDEN    1,836,356
SHEET GLASS FORMING MACHINE
Filed Jan. 9, 1928    3 Sheets-Sheet 1
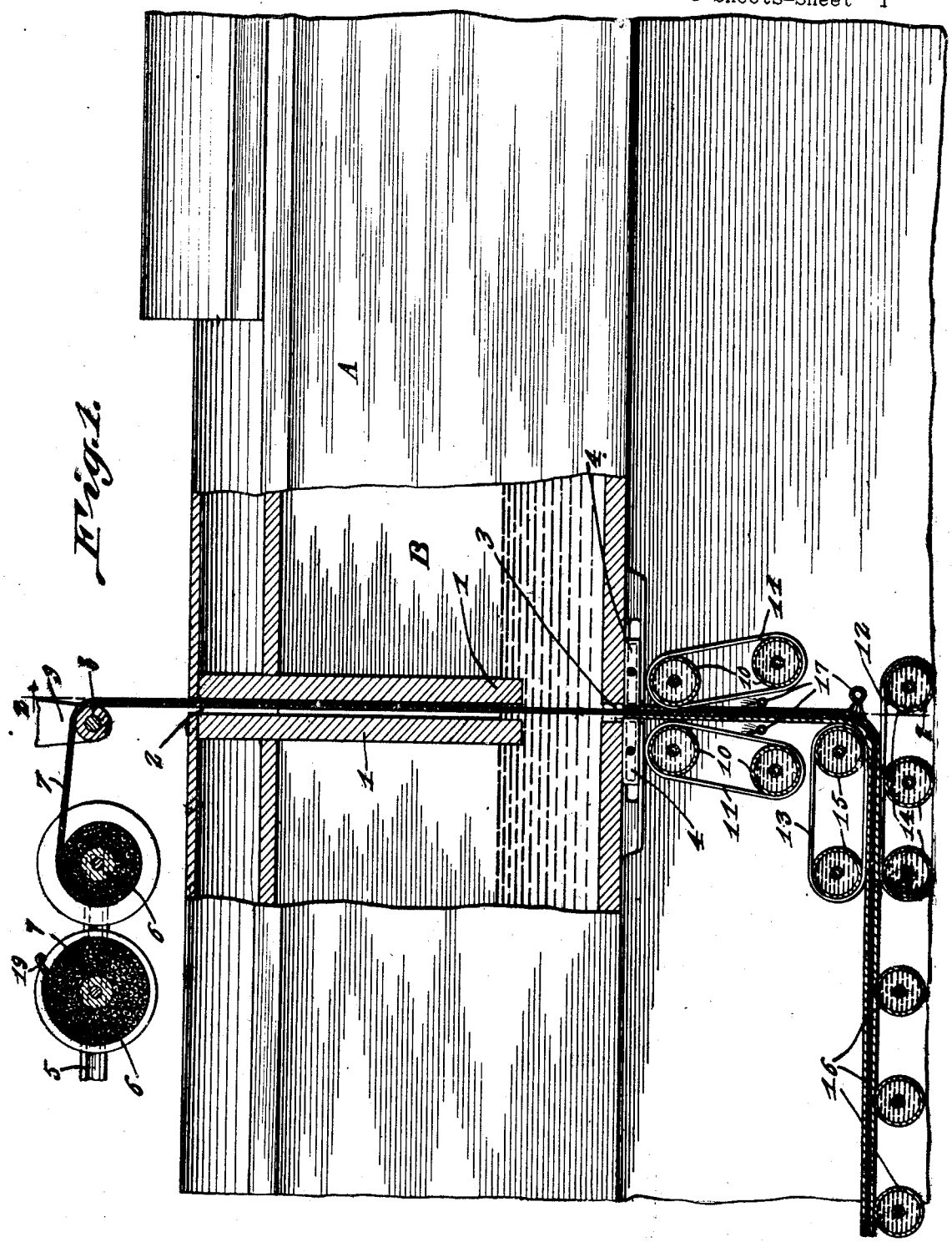
Clyde W. Belden, INVENTOR
BY Victor J. Evans
ATTORNEY Dec. 15, 1931.  C. W. BELDEN  1,836,356
SHEET GLASS FORMING MACHINE
Filed Jan. 9, 1928  3 Sheets-Sheet 2
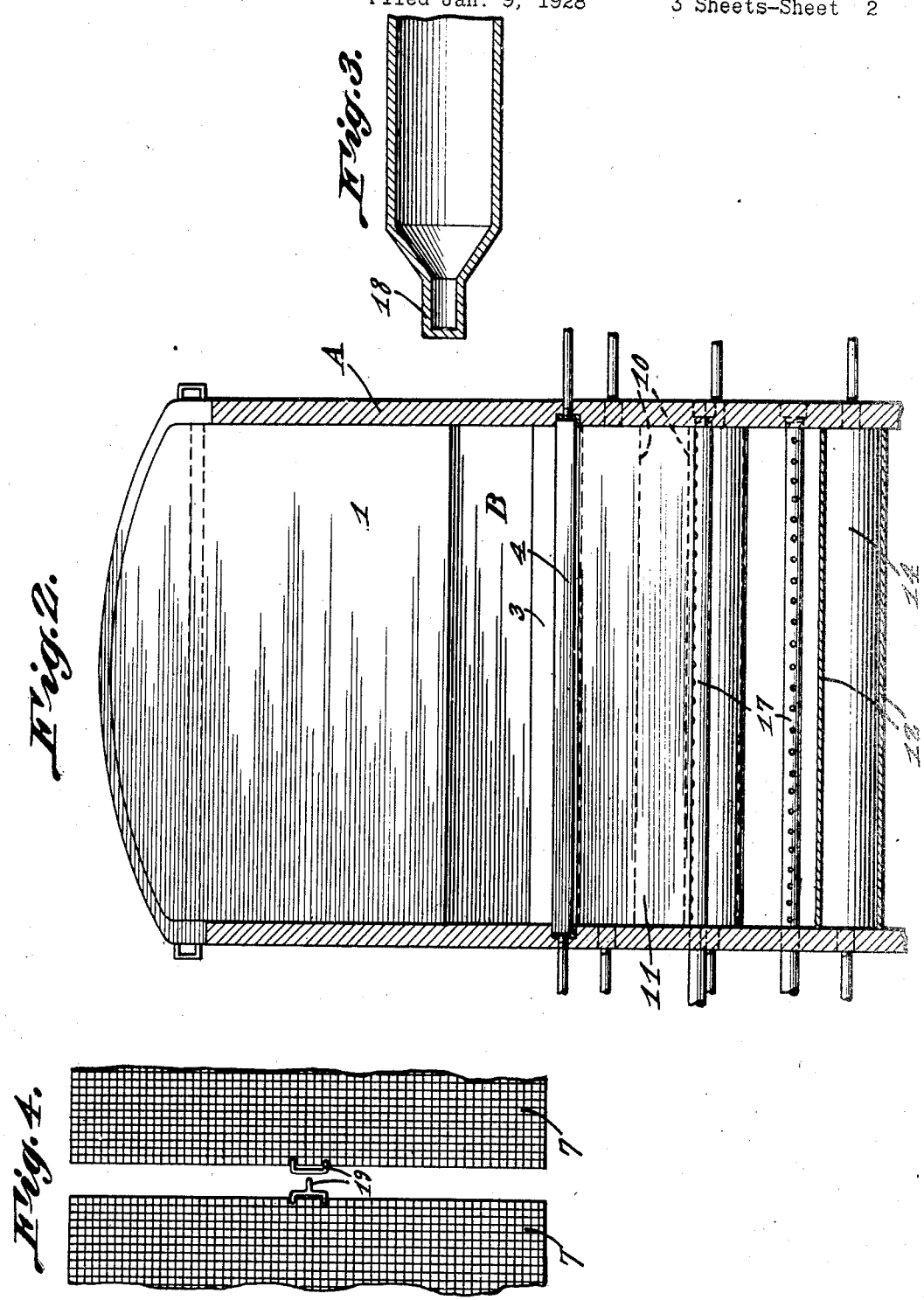
Clyde W. Belden, INVENTOR
BY Victor J. Evans
ATTORNEY Dec. 15, 1931.  C. W. BELDEN  1,836,356
SHEET GLASS FORMING MACHINE
Filed Jan. 9, 1928  3 Sheets-Sheet 3

Clyde W. Belden,
INVENTOR
BY Victor J. Evans
ATTORNEY

Patented Dec. 15, 1931

1,836,356

UNITED STATES PATENT OFFICE

CLYDE W. BELDEN, OF SHREVEPORT, LOUISIANA, ASSIGNOR TO LIBBEY-OWENS-FORD GLASS COMPANY, OF TOLEDO, OHIO

SHEET GLASS FORMING MACHINE

Application filed January 9, 1928. Serial No. 245,512.

This invention relates to an apparatus for forming sheet glass, the general object of the invention being to provide a metal belt passing over rollers for engaging a portion of the sheet and which, in the major forms of the invention, acts as a bending and flattening table for the sheet.

Another object of the invention is to provide heating and cooling means for the portions of the belt which are out of contact with the sheet so that the temperature of that portion of the belt engaging the sheet can be changed, as required.

A still further object of the invention is to provide means for drawing a strip of wire mesh through molten glass so that the wire will be coated with the glass to form a sheet of wire glass.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is an elevation with parts broken away and largely diagrammatic, showing one form of the invention.

Figure 2 is a section on line 2—2 of Figure 1.

Figure 3 is a sectional detail view of one of the rollers used in the apparatus.

Figure 4 is a view showing how two strips of wire mesh may be connected together.

Figure 5:
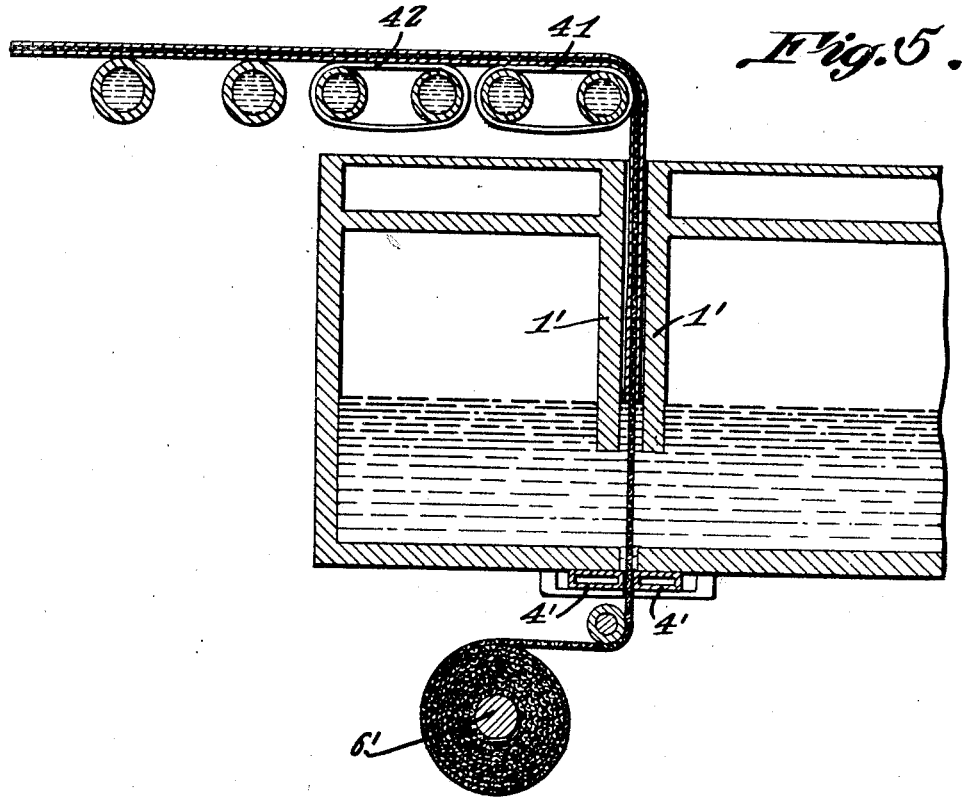
Figure 5 is a sectional view showing another modification.

In Figure 1, A indicates the melting furnace of a glass forming apparatus and B indicates the working chamber of the furnace, (see also Figure 2). A pair of spaced partitions 1 extend downwardly from the top of the chamber B to a point where their lower ends are below the level of the molten glass in said chamber, these partitions forming a vertical channel or space which registers with an opening 2 formed in the top of the chamber and this space is also in alignment with an opening 3 in the bottom of the chamber. The opening 3 is controlled by a pair of gates 4 which are of hollow construction so that they can be filled with water or other cooling mediums. These gates can be moved to a position to entirely close the opening or to make it of various widths.

A track 5 is arranged above the furnace to support a number of reels 6 which have wound thereon the woven wire 7. A guide roller 8 is supported by the hanger 9 and has a portion of its periphery in alignment with the space between the partitions 1. Two sets of hollow rollers 10 are arranged below the bottom of the chamber B, a set being arranged on each side of the opening 3. A metal belt 11 is carried by each set of rollers and as the lower rollers are arranged farther apart than are the upper rollers, the belts have their flat portions arranged in a plane slightly inclined from the vertical. The wire from the first reel is passed over the guiding roller 8, through opening 2 and the passage formed by the partitions 1 and through the molten glass in the lower part of the chamber B, between the gates, and through the space formed by the belts. As the wire passes through the molten glass, some of the glass will adhere to the wire and this glass coated wire is gripped by the portions of the belts passing over the upper rollers and thus the movement of the belts will draw the wire through the chamber B and the belts also act to press the glass against the wire and flatten the glass. After passing from the belts 11, the wire is passed between the horizontally arranged belts 12 and 13 which are so supported by the hollow rollers 14 and 15 that a space is formed by the belts to receive the glass sheet. As the glass sheet passes into said space, it is turned at right angles by that portion of the belt 13 which is passing around the front roller 15. The belt 12 acts as a flattening table and this belt and the belt 13 acts to feed the glass sheet on to the Lehr rollers 16. All the rollers below the chamber B are made hollow so as to contain a cooling medium and the shaft of each roller may be made hollow so that the cooling medium may be introduced into the shaft and it will then pass from the shaft through perforations therein into the roller. Gas burners 17 may be placed wherever desired to supply heat to the parts and means may be provided for heating or cooling those portions of the belts which are not in contact with the sheet, to prevent the belts getting too hot or too cool.

Figure 3 shows a modified form of roller for the belts which is provided with reduced ends 18, these ends forming pintles for the rollers.

Figure 4 shows the ends of the strips of wire formed with hooks 19, so that the wire on one reel can be fastened to the end of the wire leaving the front reel, thus enabling the wire glass to be formed in a continuous sheet.

As will be seen, the metal belts 11, 12 and 13 pull the wire through the glass so as to form a continuous sheet of wire glass and these belts also act to press the glass against the wire, thus forming the sheet, and the belts 12 and 13 act to turn the sheet from a vertical position into a horizontal one, the belt 12 also acting as a flattening table. The belts with the gates also act to control the thickness of the sheet being formed, and by forming various configurations or designs on the belts, or on one or more of the belts, such configurations or designs will be impressed in the glass sheet to produce figured glass.

The channel formed by the partitions 1 prevent air and heat from coming in contact with the wire so that the wire is prevented from being damaged by the heat from the furnace.

Figure 5 shows another modification in which the wire is pulled upwardly through the glass reservoir and through a channel formed by the partitions 1'. The sheet of wire glass passes over the flattening and turning table formed by the belt 41 and its supporting rollers and from this table, the belt passes on to a second belt 42 which, of course, is also provided with supporting rollers. The opening in the lower part of the glass reservoir is controlled by the gates 4', as in the first form of the invention. Of course, the wire carrying reel 6' in this case is arranged below the glass reservoir.

Figure 6:
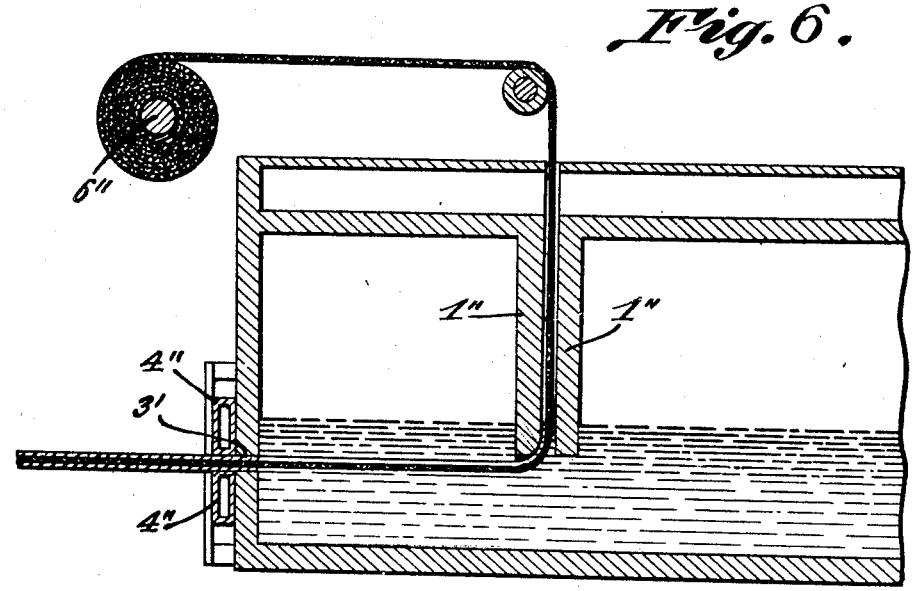
Figure 6 is a sectional view of a further modification.

In Figure 6, the wire passes downwardly through the channel formed by the partitions 1'' and then the glass coated wire passes through an opening 3' formed in the side of the glass reservoir instead of the bottom thereof, this opening being controlled by the gates 4''. Of course, in this case, the reel 6'' is arranged above the glass reservoir.

By having the rollers of the metal belts cooled, the belts are kept from being overheated by the heat coming from the glass sheet passing over it and each belt can be cooled or heated as required to keep its temperature at the proper point, without the cooling or heating medium coming in contact with the glass sheet. The belt pulls the glass sheet from the reservoir, bends it as it turn over the part of the belt passing over the roller and then flattens the sheet while the glass remains on its smooth unbroken surface. As shown by the drawings, one belt can be used alone or a group of belts may be used to carry the glass sheet the entire length of the machine and lehr.

This invention will enable wire glass to be manufactured so that it can sell at low cost as the glass can be formed in a continuous process and the entire operation is practically automatic, except that the ends of the wire sheets must be connected together as a sheet is leaving its reel. The glass sheets can be made of various thicknesses by adjuting the part and by using the closed channel, the wire is protected from the heat from the furnace.

It will, of course, be understood that the various rolls and rollers are driven from any suitable means. The cooling medium is circulated through the shafts and rollers by any suitable means and it must be understood that the wire can be passed through the glass in either direction by simply placing the reel of wire above or below the reservoir and the drawing means in a reverse position to the reel. For instance, Figure 1 shows the sheet glass being pulled downwardly by the belts, but by arranging these belts above the reservoir, the sheet can be pulled upwardly by the belts. It is necessary to protect the wire and the sheet glass from the heat of the furnace when these parts pass through the reservoir above the glass.

It is thought from the foregoing description that the advantages and novel features of my invention will be readily apparent.

It is to be understood that I may make changes in the construction and in the combination and arrangement of the several parts, provided that such changes fall within the scope of the appended claims.

What I claim is:—

1. In a wire glass forming machine, a furnace including a substantially closed working chamber containing a mass of molten glass and comprising a bottom, side walls and top, said chamber having an outlet therein beneath the level of the molten glass, means for passing a wire mesh through the working chamber and also through the opening so that some of the glass will adhere to the wire to form a sheet of wire glass, and means positioned within the working chamber above the mass of molten glass for protecting the wire mesh above the molten glass from the heat in said chamber.

2. In a wire glass forming machine, a furnace including a substantially closed working chamber containing a mass of molten glass and comprising a bottom, side walls and top, said chamber having an outlet therein beneath the level of the molten glass, means for passing a wire mesh through the working chamber and also through the opening so that some of the glass will adhere to the wire to form a sheet of wire glass, and means positioned within the working chamber above the mass of molten glass for protecting the wire mesh above the molten glass from the heat in said chamber, such means comprising a pair of spaced partitions extending downwardly from the top of the working chamber and forming a vertical channel between which the wire mesh is passed.

3. In a wire glass forming machine, a furnace including a substantially closed working chamber containing a mass of molten glass and comprising a bottom, side walls and top, said chamber having an outlet therein beneath the level of the molten glass, means for passing a wire mesh through the working chamber and also through the opening so that some of the glass will adhere to the wire to form a sheet of wire glass, and means positioned within the working chamber above the mass of molten glass for protecting the wire mesh above the molten glass from the heat in said chamber, such means comprising a pair of spaced partitions extending downwardly from the top of the working chamber and forming a vertical channel between which the wire mesh is passed, the lower ends of said partitions terminating beneath the level of the molten glass.

4. In a wire glass forming machine, a furnace including a substantially closed working chamber containing a mass of molten glass and comprising a bottom, side walls and top, said top and bottom having openings therein in substantial vertical alignment with one another, means for passing a wire mesh through the working chamber and also through said openings so that some of the glass will adhere to the wire to form a sheet of wire glass, and means positioned within the working chamber above the mass of molten glass for protecting the wire mesh above the molten glass from the heat in said chamber, such means comprising a pair of spaced partitions extending downwardly from the top of the working chamber and forming a vertical channel which registers with the openings in the top and bottom of the chamber and between which the wire mesh is passed.

5. In a wire glass forming machine, a furnace including a substantially closed working chamber containing a mass of molten glass and comprising a bottom, side walls and top, said top and bottom having openings therein in substantial vertical alignment with one another, means for passing a wire mesh through the working chamber and also through said openings so that some of the glass will adhere to the wire to form a sheet of wire glass, and means positioned within the working chamber above the mass of molten glass for protecting the wire mesh above the molten glass from the heat in said chamber such means comprising a pair of spaced partitions extending downwardly from the top of the working chamber and forming a vertical channel which registers with the openings in the top and bottom of the chamber and between which the wire mesh is passed, the lower ends of said partitions being immersed within the mass of molten glass.

In testimony whereof I affix my signature.

CLYDE W. BELDEN.